United States Patent [19]
Sasajima

[11] Patent Number: 4,867,599
[45] Date of Patent: Sep. 19, 1989

[54] AUTOMOTIVE COLUMN COVER

[75] Inventor: Muneharu Sasajima, Ichinomiya, Japan

[73] Assignee: Toyoda Gosei Co., Ltd., Nishikasugai, Japan

[21] Appl. No.: 234,100

[22] Filed: Aug. 19, 1988

[30] Foreign Application Priority Data

Oct. 15, 1987 [JP] Japan .................. 62-260523

[51] Int. Cl.$^4$ .............................................. F16B 3/00
[52] U.S. Cl. .................... 403/405.1; 24/615; 24/297; 248/221.4; 248/224.4; 411/508; 403/408.1
[58] Field of Search ............... 248/221.4, 225.1, 224.3, 248/224.4, 73; 403/335, 405.1, 406.1, 407.1, 408.1; 411/508, 509, 510, 512, 908, 913, 104, 174, 175; 24/615, 616, 614, 297

[56] References Cited

U.S. PATENT DOCUMENTS

| | | | |
|---|---|---|---|
| 2,526,790 | 10/1950 | Wroblewski | 403/407.1 |
| 3,550,217 | 12/1970 | Collyer | 411/509 |
| 3,577,603 | 5/1971 | Seckerson | 411/510 |
| 3,860,999 | 1/1975 | Meyer | 411/508 |
| 3,879,915 | 4/1975 | Atwater | 403/406.1 |
| 4,312,165 | 1/1982 | Mizusawa | 411/510 |
| 4,402,641 | 9/1983 | Arff | 411/510 |
| 4,568,215 | 2/1986 | Nelson | 403/406.1 |
| 4,716,633 | 1/1988 | Rizo | 411/508 |
| 4,765,036 | 8/1988 | Iguchi et al. | 24/297 |

FOREIGN PATENT DOCUMENTS 60-31962 9/1985 Japan .

Primary Examiner—Andrew V. Kundrat
Assistant Examiner—Carol I. Bordas
Attorney, Agent, or Firm—Cushman, Darby & Cushman

[57] ABSTRACT

An automotive column cover has a first cover member, a second cover member to which the first cover member is secured, and a clip for connecting together these two members. The clip has a securing portion which is fitted to the first cover member and an engaging portion which is engaged with the second cover member. The first cover member has a secured portion to which the securing portion of the clip is fitted, while the second cover member has an engaged portion provided so as to face the secured portion of the first member and the engaged portion is engaged with the engaging portion of the clip. The securing portion of the clip is fitted to the secured portion of the first cover member, while the engaging portion of the clip is engaged with the engaged portion of the second cover member, whereby the two cover members are readily connected together.

8 Claims, 3 Drawing Sheets

AUTOMOTIVE COLUMN COVER

BACKGROUND OF THE INVENTION

The present invention relates to an automotive column cover and, more particularly, to a mounting structure for a column cover in which two members are connected together.

One type of conventional column cover for use in an automobile comprises two members which are connected together. This type of column cover is mounted in such a manner that two, upper and lower, members are disposed such that a steering shaft and switches are covered therewith and relatively long bosses which project inside the two members are butted against each other and connected together by means of tapping screws.

More specifically, a column cover 51 made of a synthetic resin material has a lower member 52 and an upper member 55 to which the lower member 52 is secured, as shown in FIGS. 1 and 2. The lower member 52 has tubular bosses 53 projecting inward in such a manner that the bosses 53 do not interfere with the associated steering shaft and switches Each boss 53 has a mounting hole 53a. On the other hand, the upper member 55 has tubular bosses 56 projecting so as to face the respective bosses 53, each boss 56 having a tapped hole 56a.

To secure the lower member 52 to the upper member 55, these two members are disposed such that the bosses 53 and 56 face each other, and a tapping screw 50 is screwed into the tapped hole 56a in each boss 56 from the mounting hole 53a in the corresponding boss 53, thereby firmly connecting them to each other.

The above-described conventional column cover mounting structure suffers, however, from the following problems. Since it is necessary to screw the tapping screws 50 in order to connect the lower and upper members 52 and 55, the mounting operation is troublesome and needs a great deal of time.

Another problem is that the mounting holes 53a provided in the bosses 53 are open in the outer surface of the lower member 52. More specifically, if the bosses 53 are disposed in close proximity to the side walls of the lower member 52 due to a positional relationship between the the bosses 53 and the internal mechanism covered with the column cover 51, the mounting holes 53a are opened in the corners, respectively, of the lower member 52. In consequence, the openings of the mounting holes 53a are enlarged or deformed as shown by the arrows B in FIGS. 1 and 2, resulting in the appearance quality being impaired.

Further, since relatively long bosses 53 and 56 are employed, it is necessary to take measures to prevent sink at the root of each boss.

SUMMARY OF THE INVENTION

In view of the above, it is an object of the present invention to provide an automotive column cover which is so designed that the operation of connecting together two members is facilitated to enable a reduction in the time required to mount the column cover.

It is another object of the present invention to provide an automotive column cover which is only slightly dependent on an internal mechanism covered with the column cover.

It is still another object of the present invention to provide an automotive column cover arranged such that it is possible to improve moldability in terms of short molding, sinking, releasability, etc., and there is no fear of the appearance quality being impaired due to the position of the tapped holes.

The present invention provides an automotive column cover having a first cover member, a second cover member to which the first cover member is secured, and a clip for connecting together these two members, wherein the clip has a securing portion which is fitted to the first cover member and an engaging portion which s engaged with the second cover member; the first cover member has a secured portion to which the securing portion of the clip is fitted; the second cover member has an engaged portion with which the engaging portion of the clip is engaged, the engaged portion being provided so as to face the secured portion of the first cover member; and the first and second cover member are connected together in such a manner that the securing portion of the clip is fitted to the secured portion of the first cover member, while the engaging portion of the clip is engaged with the engaged portion of the second cover member, thereby assembling the automotive column cover.

In the automotive column cover according to the present invention, the securing portion of the clip is fitted to the secured portion of the first cover member, and the engaging portion of the clip is engaged with the engaged portion of the second cover member, whereby the first and second cover members are connected together. Therefore, the first and second cover members can be readily connected together through the clip. Accordingly, the present invention facilitates the mounting operation and enables a reduction in the time required to mount the column cover as compared with the conventional mounting structure in which tapping screws are employed to connect together two cover members.

Further, since the secured and engaged portions can be formed locally and in thin-walled configurations on the respective side walls of the first and second cover members, these portions are much less restricted by the internal mechanism covered with the column cover than in the case where long bosses are provided on the two members, so that it is possible to increase the degree of freedom with which the column cover is designed.

In addition, it is unnecessary to take measures to prevent sink at the root of each long boss.

Further, the present invention is free from large openings of boss mounting holes such as those which have heretofore been provided in the outer surface of the column cover, and there is no enlargement or deformation of such openings when disposed in the corners of the column cover. Thus, it is possible to improve the appearance quality of the column cover.

Further, it is possible to improve moldability, that is, there is no fear of a molding defect which has heretofore been experienced with the conventional column cover due to short molding in the formation of long bosses, and it is also possible to improve releasability.

DESCRIPTION OF THE PREFERRED EMBODIMENT

Figure 1:
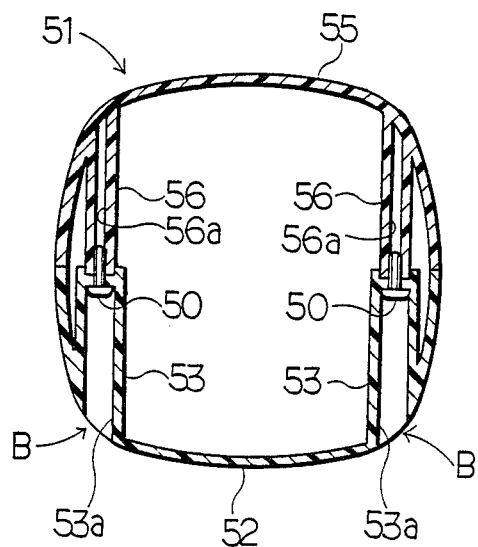
FIG. 1 is a sectional view of a conventional column cover made of a synthetic resin material.
Figure 2:
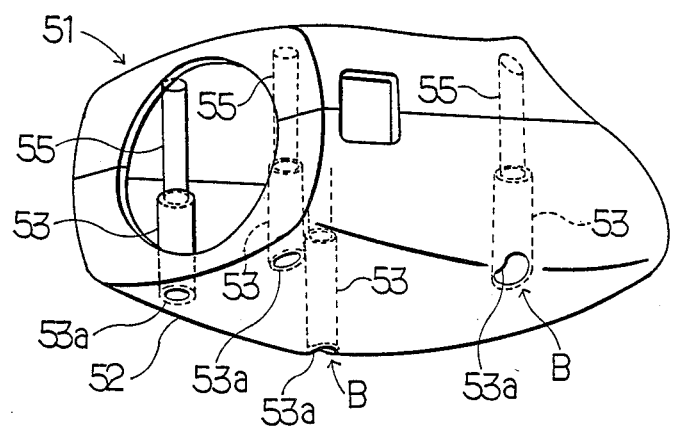
FIG. 2 is a perspective view of the conventional column cover.
Figure 3:
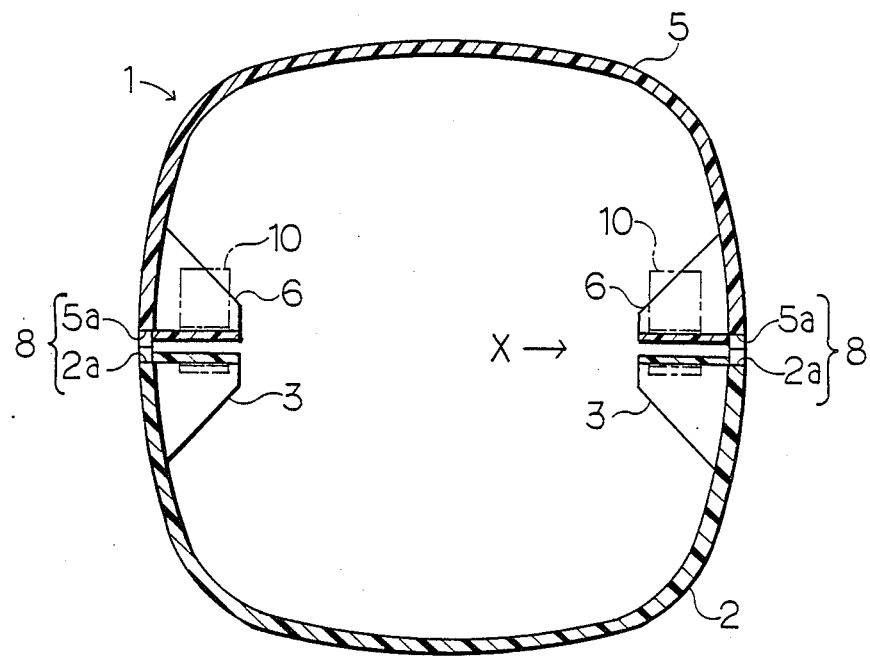
FIG. 3 is a sectional view of a column cover according to one embodiment of the present invention.
Figure 4:
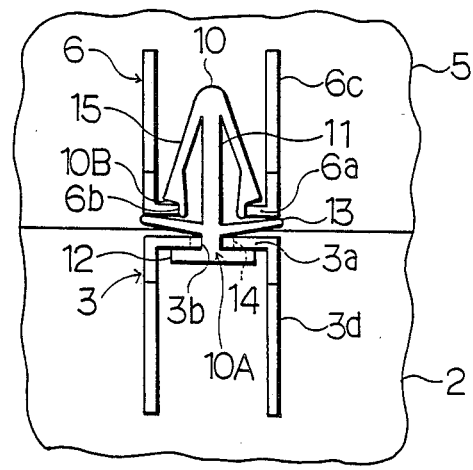
FIG. 4 shows a part of FIG. 3 as viewed from the direction of the arrow X.
Figure 5:
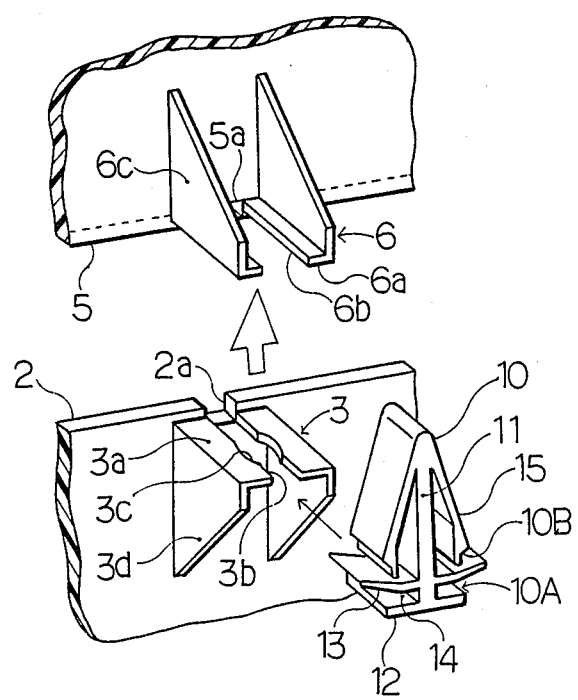
FIG. 5 is a fragmentary perspective view showing the mounting structure of the embodiment.
Figure 6:
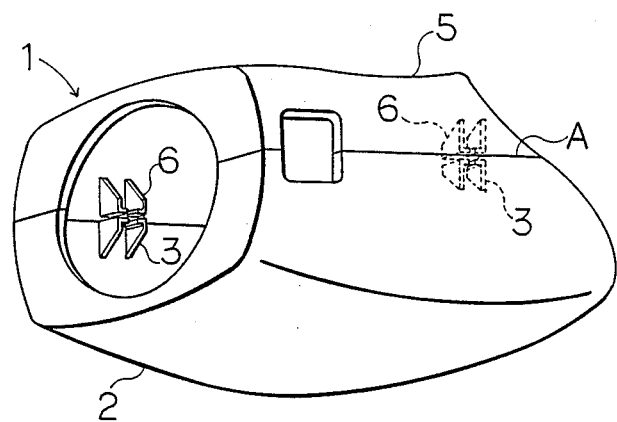
FIG. 6 is a general perspective view of the column cover according to the embodiment.

One embodiment of the present invention will be described hereinunder with reference to FIGS. 3 to 6.

In the figures, the reference numeral 1 denotes an automotive column cover made of a synthetic resin material. The column cover 1 has a lower member 2 and an upper member 5 to which the lower member 2 is secured, the lower and upper members 2 and 5 being produced in the form of splittable members which are connected together at the joint A shown in FIG. 6. The lower and upper members 2 and 5 are joined together through a clip 10 at each position where a secured portion 3 and an engaged portion 6 which are respectively provided on the inner sides of the lower and upper members 2 and 5 face each other.

The lower member 2 is molded out of a synthetic resin material such as PP, ABS or the like. The lower member 2 has a plurality of secured portions 3 which are provided at predetermined positions, respectively, on the upper end portion of the side wall in such a manner that the secured portions 3 project inward from the side wall substantially perpendicular thereto. Each secured portion 3 has an opposing portion 3a which faces the opposing portion 6a of the corresponding engaged portion 6 provided on the upper member 5. The opposing portion 3a is provided in its central portion with a fitting groove 3b which is engageable with the securing portion 10A of a clip 10 (described later). The fitting groove 3b is provided with a recess 3c which is engageable with a projection 14 provided on the clip 10. Further, the opposing portion 3a is provided at each end thereof with a rib 3d for reinforcing the opposing portion 3a. A notch 2a is provided in the side wall of the lower member 2 at a position which is contiguous with the fitting groove 3b provided in the secured portion 3. The notch 2a cooperates with a notch 5a provided in the upper member 5 (described later) to define a tool inserting bore 8.

The upper member 5 is also molded from a synthetic resin material such as PP, ABS or the like. A plurality of engaged portions 6 are provided at the lower end of the side wall of the upper member 5 in such a manner that the engaged portions 6 project inward from the side wall substantially perpendicular thereto at predetermined positions corresponding to the respective secured portions 3 of the lower member 2. Each engaged portion 6 has an opposing portion 6a which faces the opposing portion 3a of the corresponding secured portion 3 provided on the lower member 2. The opposing portion 6a is provided in its central portion with an engagement groove 6b which is engageable with the engaging portion 10B of a clip 10 (describe d later). The opposing portion 6a is provided at each end thereof with a rib 6c for reinforcing the opposing portion 6a. A notch 5a is provided in the side wall of the upper member 5 at a position which is contiguous with the engagement groove 6b provided in the engagement portion 6.

The clip 10 is molded from a synthetic resin material having both rigidity and elasticity, such as a polyamide, polyacetal, or ABS. The clip 10 has an axial plate portion 11, a securing portion 10A and an engaging portion 10B. Each of the securing and engaging portions 10A and 10B is formed in bilateral symmetry with respect to the axial plate portion 11. At the lower end (as viewed in FIG. 5) of the axial plate portion 11 are provided a base portion 12 which projects both rightward and leftward and an elastic lip portion 13 formed above the base portion 12 so as to extend slightly upward in both the rightward and leftward directions. The elastic lip portion 13 that has the above mentioned configuration is able to exhibit the elasticity of the resin material itself when the clip 10 is engaged. The base portion 12 and the elastic lip portion 13 define in combination the securing portion 10A. An arcuately raised projection 14 is formed on each side of that portion of the axial plate portion 11 which extends between the base portion 12 and the elastic lip portion 13. Thus, when the securing portion 10A is fitted into the fitting groove 3a in the secured portion 3, the projection 14 is fitted into the corresponding recess 3c to thereby effect positioning of the clip 10. An elastic arm portion 15 which extends obliquely downward is provided at the upper end of the axial plate portion 11. The arm portion 15 has step-shaped engaging portion 10B formed at each lower end portion. The engaging portion 10B is elastically deformable by virtue of the elasticity of the resin material constituting the elastic arm portion 15.

The following is a description of the operation of securing the lower member 2 to the upper member 5 using the clip 10 according to this embodiment.

First, the securing portion 10A of the clip 10 is fitted into the fitting groove 3b provided in the opposing portion 3a of each secured portion 3 of the lower member 2. At this time, the axial plate portion 11 of the securing portion 10A is fitted into the fitting groove 3b and, at the same time, the projections 14 enter the fitting groove 3b while slightly expanding it and are eventually fitted into the respective recesses 3c, thereby effecting positioning of the clip 10. In this way, a clip 10 is fitted into each secured portion 3 with the downwardly diverging arrow-shaped elastic arm portion 15 projecting from the upper end of the side wall of the lower member 2.

Next, the lower member 2 and the upper member 5 are disposed such as to face each other so that the elastic arm portion 15 of the clip 10 fitted into each secured portion 3 faces the engagement groove 6b in the corresponding engaged portion 6. In this state, the lower and upper members 2 and 5 are pressed toward each other. In consequence, the elastic arm portion 15 of each clip 10 is pressed at both sides thereof against the peripheral edge of the engagement groove 6b in the corresponding engaged portion 6 and, while doing so, the arm portion 15 advances into the engagement groove 6b. Thus, the elastic arm portion 15, which is divergent in the shape of an arrowhead, passes through the engagement groove 6b while being compressed from both the right and left sides, and when the engaging portion 10B reaches the engagement groove 6b, the elastic arm portion 15 is restored to its previous configuration by virtue of its own resilience, so that the engaging portion 10B is resiliently engaged with the opposing portion 6a. At this time, the elastic lip portion 13 is in resilient contact with the lower surface of the opposing portion 6a, and the lower and upper members 2 and 5 are therefore firmly connected together while being in close contact with each other at the joint A, thus completing a column cover 1. Further, the side wall of the column colver 1 is provided with a tool inserting bore 8 defined by the notches 2a and 5a at a position between the respective opposing portions 3a and 6a of each pair of secured and engaged portions 3 and 6.

To separate the column cover 1 formed as described above at the time, for example, of maintenance, the following two methods may be employed. According to a first method, the lower and upper members 2 and 5 are forcedly pulled away from each other, thereby deflecting the elastic arm portion 15, and thus allowing the column colver 1 to be split into the lower and upper members 2 and 5. According to a second method, a thin rod-shaped tool is inserted into each tool inserting bore 8 in the column cover 1 to push out inward the clip 10 which is engaged with the secured and engaged portions 3 and 6 along the fitting and engagement grooves 3b and 6b. As a result, each clip 10 is disengaged from the secured and engaged portions 3 and 6, thus enabling the lower and upper members 2 and 5 to be separated from each other with ease. It should be noted that, since in the automotive column cover each of the secured and engaged portions 3 and 6 is formed in the shape of a rib, there is no thick-walled portion and there is therefore no fear of a problem in terms of molding, for example, sink, occurring on the outer surfaces of the lower and upper members 2 and 5.

It should be noted that the present invention is not necessarily limited to the above-described embodiment and various changes and modifications may be imparted thereto. For example, although in the foregoing embodiment the lower member is secured to the upper member, the latter may be secured to the former.

There is no particular restriction on the configuration of the clips, but it is preferable that the clips have a configuration by which each clip is readily inserted into and disengaged from grooves respectively provided in a secured portion and an engaged portion. In addition, each clip may also be secured to the corresponding secured portion by means of bonding or welding.

What is claimed is:

1. An automotive column cover which is fitted to a column portion of an automobile, comprising:
   (a) a clip having a securing portion which is fitted to a first cover member and an engaging portion which is engaged with a second cover member to which said first cover member is secured;
   (b) said first cover member having a secured portion to which the securing portion of said clip is fitted;
   (c) said second cover member having an engaged portion provided so as to face the secured portion of said first cover member, said engaged portion being engaged with the engaging portion of said clip; and
   (d) said first and second cover members being connected together in such a manner that the securing portion of said clip is fitted to the secured portion of said first cover member and the engaging portion of said clip is engaged with the engaged portion of said second cover member.

2. An automotive column cover according to claim 1, wherein said secured portion has a fitting groove formed in the center of an opposing portion thereof projecting from the side wall, said groove being engageable with the securing portion of said clip, said groove being provided with a recess which is engageable with a projection provided on said clip.

3. An automotive column cover according to claim 2, wherein the side wall of said first cover member is provided with a tool inserting bore which is continuous with said fitting groove.

4. An automotive column cover according to claim 1, wherein said securing portion and said engaging portion of said clip are in a bilaterally symmetric configuration with an axial plate portion connecting center portions of said securing portion and said engaging portion,
   (a) said securing portion including a base portion projecting both rightward and leftward from a lower end of said axial plate portion, an elastic lip portion having resilience, said lip portion extending slightly upward in both the rightward and leftward directions at a position above said base portion, and a projection raised sideward from the portion of said axial plate portion which extends between said base portion and said elastic lip portion, said projection being fitted to said fitting groove of the secured portion of said first cover member,
   (b) said engaging portion being formed in the shape of a step at a distal end of an elastic arm portion having an outward biasing force, said arm portion extending obliquely downward in both the rightward and leftward directions from the upper end of said axial plate portion, said engaging portion being engageably fit to the engaging groove of the engaged portion of said second cover member.

5. An automotive column cover in cylindrical form with a hollow inside, said cover being fitted to a column portion of an automobile, comprising:
   (a) a clip having a securing portion which is formed between a base portion and an elastic lip portion and fitted to a fitting groove of a secured portion of a first cover member, and an engaging portion which is projected on an upper side of said elastic lip portion and fitted and engaged with an engaging groove of an engaged portion of a second cover member to which said first cover member is secured;
   (b) said first cover member being formed in a semi-divided cylindrical shape and provided at an inside of its opening edge with said secured portion having a rib provided on a side wall thereof so as to project inwardly and being substantially perpendicular to said side wall and said fitting groove to which said securing portion of said clip is fitted;
   (c) said second cover member being formed in a semi-divided cylindrical shape and provided at an inside of its opening edge with said engaged portion having a rib provided on a side wall thereof so as to project inwardly and being substantially perpendicular said engaging groove which is opposed to said secured portion of said first cover member and to which the engaging portion of said clip is fitted; and
   (d) said first and second cover members being opposed at opening edges respectively and connected together in such a manner that said securing portion of said clip formed between said base portion and said elastic lip portion is fitted to said fitting groove of said secured portion of said first cover member, and said engaging portion of said clip projected on said upper side of said elastic lip portion is fitted and engaged with said engaging groove of said engaged portion of said second cover member.

6. An automotive column cover according to claim 5, wherein said securing portion and said engaging portion of said clip are in a bilaterally symmetric configuration and an axial plate portion connects a center portion of each of said securing portion and said engaging portion, (a) said securing portion includes said base portion which projects both right and left from a lower end of said axial plate portion, said elastic lip portion having resilience, said lip portion extending slightly upward in both right and left directions at a position above said base portion, and a projection raised sideward from a portion of said axial plate portion which extends between said base portion and said elastic lip portion, said projection being fitted to said fitting groove of the secured portion of said first cover member, (b) said engaging portion being formed in a shape of a step at a distal end of an elastic arm portion having an outward biasing force, said arm portion extending obliquely downward in both a right and left direction from an upper end of said axial plate portion, said engaging portion being engageable fitted to said engaging groove of said engaged portion of said second cover member.

7. An automotive column cover according to claim 5 wherein said secured portion has a fitting groove formed in the center of an opening portion thereof projecting from the side wall, said groove being engageable with the securing portion of said clip, said groove being provided with a recess which is engageable with a projection provided on said clip.

8. An automotive column cover according to claim 5, wherein the side wall of said first cover member is provided with a tool inserting bore which is continuous with said fitting groove.

* * * * *